United States Patent [19]

Olson et al.

[11] Patent Number: 4,533,595

[45] Date of Patent: Aug. 6, 1985

[54] ABRASION-RESISTANT RESINOUS ARTICLES

[75] Inventors: Daniel R. Olson; Timothy W. O'Donnell, both of Schenectady, N.Y.

[73] Assignee: General Electric Company, Schenectady, N.Y.

[21] Appl. No.: 569,876

[22] Filed: Jan. 11, 1984

[51] Int. Cl.$^3$ .............................................. B32B 27/30
[52] U.S. Cl. .................. 428/336; 428/411.1; 428/412; 428/447; 428/451; 428/522; 428/520; 428/911
[58] Field of Search ............... 428/412, 447, 411, 522, 428/520, 336, 451, 911

[56] References Cited

U.S. PATENT DOCUMENTS

| | | | |
|---|---|---|---|
| 3,215,665 | 11/1965 | Sharetts et al. | 260/45.95 |
| 3,313,866 | 4/1967 | Horton et al. | 260/880 |
| 4,239,798 | 12/1980 | Schroeter et al. | 428/331 |
| 4,278,804 | 7/1981 | Ashby et al. | 556/436 |
| 4,310,650 | 1/1982 | Gupta et al. | 526/313 |
| 4,382,109 | 5/1983 | Olson | 428/412 |
| 4,395,461 | 7/1983 | Ching | 428/412 |
| 4,396,678 | 8/1983 | Olson | 428/412 |
| 4,410,594 | 10/1983 | Olson | 428/412 |

*Primary Examiner*—Ellis P. Robinson
*Attorney, Agent, or Firm*—William H. Pittman; James C. Davis, Jr.; James Magee, Jr.

[57] ABSTRACT

Resinous articles, especially polycarbonate articles, coated with an abrasion-resistant surface coating such as a silicone hardcoat, contain a primer coat between the article and the surface coating, said primer coat being a copolymer of a monomer mixture including an ethylenically unsaturated monomer having an ultraviolet degradation inhibiting moiety, preferably a 4-(2-hydroxybenzophenone)oxy moiety. The articles are characterized by improved hardcoat adhesion and resistance to discoloration and ultraviolet degradation.

13 Claims, No Drawings

ABRASION-RESISTANT RESINOUS ARTICLES

This invention relates to improved resinous articles of manufacture, and more particularly to articles containing an abrasion-resistant coating with improved adhesion and resistance to light-induced degradation.

Various industrial resins are in wide use for molding of structural articles and also, in transparent sheet form, as shatterproof substitutes for glass. Aromatic polycarbonates are examples of such industrial resins. One of the problems with their use is susceptibility of damage by solvent action and abrasion.

This problem is typically overcome by coating the surface of the resin with an abrasion-resistant coating, sometimes referred to hereinafter as a "hardcoat". Many of such hardcoats are polysiloxane resins containing colloidal silica; they are frequently designated hereinafter as "silicone hardcoats". While silicone and other hardcoats serve this purpose quite well, their adhesion to the base resin is frequently inadequate, necessitating the use of an adherent primer coating between the base resin and the hardcoat.

A second problem which frequently arises is the tendency of the base resin to degrade and discolor upon exposure to light. Such degradation is generally accepted as being the result of exposure of the resin to ultraviolet radiation. It is frequently suppressed by a compound which serves as a ultraviolet screening agent or similar ultraviolet degradation inhibitor. Such compound may be incorporated in or coated on the base resin or incorporated in the primer coating or hardcoat.

Unfortunately, the use of such screening agents, especially as part of the primer or hardcoat, introduces still other problems. Among these are decreased adhesion of the hardcoat even when a primer is used, loss of abrasion resistance in the hardcoat, cracking of the hardcoat, and the presence of a pink color in the hardcoat after curing. It is believed that some of these problems arise from the presence of the screening agent in the hardcoat, either originally or as the result of diffusion from the primer. The pink color is most often observed when the screening agent is originally present in the hardcoat.

A principal object of the present invention, therefore, is to provide improved resinous articles characterized by resistance to abrasion and to ultraviolet degradation.

A further object is to provide resinous articles with an abrasion-resistant hardcoat whose adhesion is promoted by an improved primer containing an ultraviolet screening agent permanently incorporated therein.

A further object is to provide improved polycarbonate articles containing silicone hardcoats characterized by excellent adhesion and resistance to discoloration and ultraviolet degradation.

A still further object is to provide articles as described hereinabove containing an improved acrylic primer coating between the base resin and the hardcoat layer.

Other objects will in part be obvious and will in part appear hereinafter.

The present invention is based on the discovery that certain polymerizable ultraviolet screening agents may be copolymerized with primer-producing monomers to form a polymeric primer which provides excellent adhesion of the hardcoat to the base resin as well as excellent resistance to ultraviolet degradation. At the same time, it has unexpectedly been found that the screening moieties in the primer layer prevent discoloration of the hardcoat even when a screening agent is also present therein.

In its broadest sense, therefore, the subject matter of the present invention is a solid article of manufacture comprising (A) a resin base; (B) an abrasion-resistant surface coating on said resin base; and (C) a primer coating between said resin base and said surface coating, said primer coating comprising an addition copolymer of a monomer mixture comprising (C-1) a major proportion of at least one acrylic monomer and (C-2) a minor proportion of at least one ethylenically unsaturated monomer having the formula $$CH_2=\underset{R^1}{C}-Z-X^1, \qquad (I)$$

wherein $R^1$ is hydrogen or methyl, Z is a substantially inert linking group, and $X^1$ is an ultraviolet degradation-inhibiting moiety.

The articles of manufacture of the present invention may be formed in conventional manners such as injection molding, extrusion, casting, cold forming, vacuum forming, blow molding, compression molding or transfer molding. They include both finished articles and stock material, the latter being exemplified by sheets and films. Transparent articles are preferred and are most often provided in sheet form.

Component A, the resin base, can comprise any suitable industrial resin. Illustrative resins are the aromatic polycarbonates, polyphenylene oxides, acrylics, thermoplastic polyesters, polyamides, polyimides, acrylonitrile-styrene copolymers, acrylonitrile-butadiene-styrene terpolymers, polyethylene and polyvinyl chloride. The invention is particularly applicable to polycarbonates and frequent reference will be made to them hereinafter. However, it should be understood that other suitable industrial resins may be substituted for polycarbonates when appropriate.

The polycarbonates are well known in the art; they are ordinarily prepared by reacting a polyhydroxyaromatic compound with a carbonate precursor such as phosgene, a haloformate or a carbonate ester. A dihydroxyaromatic compound may be used, whereupon a linear polymer containing units of the formula $$-O-A-O-\overset{O}{\underset{\|}{C}}-,$$

wherein A is an aromatic radical derived from the dihydroxyaromatic compound, is obtained. Alternatively, a combination of dihydroxyaromatic and trihydroxyaromatic or other polyfunctional compounds may be used whereupon the resin may be branched or crosslinked.

Most often, the polycarbonate is prepared exclusively from one or more dihydroxyaromatic compounds. Suitable compounds of this type which may be used for the preparation of polycarbonates are disclosed in a large number of U.S. patents including the following, the disclosures of which are incorporated by reference herein:

U.S. Pat. Nos. 3,161,615; 3,220,973; 3,312,659; 3,312,660; 3,313,777; 3,666,614; 3,875,256; 3,989,672; 4,377,662.

From the standpoint of the present invention, the preferred polycarbonates are those prepared from 2,2- bis(4-hydroxyphenyl)propane, referred to hereinafter as "bisphenol A".

Other examples of suitable base resins are the polyester-polycarbonates of the type obtained by the reaction of at least one polyhydroxyaromatic compound with a mixture of phosgene and a dicarboxylic acid chloride such as isophthaloyl chloride. Such polyester-polycarbonates are also known in the art and are disclosed in a number of patents and publications.

The molecular weight of the base resin is not critical, and those skilled in the art will easily be able to determine suitable molecular weight ranges. In the case of polycarbonates, for example, satisfactory molecular weights are generally represented by intrinsic viscosities within the range of about 0.3–1.0, preferably about 0.4–0.65, as measured in methylene chloride at 25° C.

Component B, the abrasion-resistant surface coating or hardcoat, is often adhered to the entire surface of the base resin article. It is within the scope of the invention, however, for the hardcoat to be adhered to only a portion of said surface, as, for example, to only one surface of a transparent sheet.

A variety of hardcoats may be used as component B; included are silicone hardcoats, various organic coatings, glass coatings, metal oxide coatings and evaporative or "sputtered" coatings. Silicone hardcoats are preferred, and reference to them will frequently by made hereinafter; however, it should be understood that other types of hardcoats may be substituted for silicone hardcoats when appropriate.

Typical coating compositions for producing silicone hardcoats comprise aqueous alcohol solutions of partial condensates of silanols of the formula $RSi(OH)_3$, wherein R is an alkyl radical containing 1–3 carbon atoms or an aryl radical. Colloidal silica is usually also present in dispersion. Typically, such compositions are prepared by adding an aqueous dispersion of colloidal silica to a solution in aqueous alkanol of an alkyl- or aryltrialkoxysilane which contains a small proportion of an acetoxy reagent such as acetic acid or an alkyltriacetoxysilane. A two-phase system is initially formed; upon standing for about 6–8 hours at a temperature in the range of about 20°–40° C., a single phase forms. During this time and upon further hydrolysis, typically for a period of about 24–48 hours depending on the desired final viscosity, the trialkoxysilane is hydrolyzed and partially condensed to form siloxanols. The degree of condensation and the viscosity of the coating composition vary with time and with the pH of the original composition, which, for maximum shelf life, should be maintained within the range of about 3–8 with the exact value dependent to some degree on the chemical nature of the composition.

The coating composition may optionally contain other ingredients. For example, polysiloxane polyether copolymers are effective as flow control agents, and functionally terminated oligosiloxanes wherein the end groups are hydroxy, alkoxy or amino react with the siloxanols upon curing improve the crack resistance of the hardcoat. Also contemplated are ultraviolet screening agents known in the art, which typically contain functional groups of the type disclosed hereinafter.

Silicone hardcoat-forming compositions as described hereinabove are known in the art and are disclosed, for example, in the following U.S. patents:

U.S. Pat. No. 3,986,997; 4,239,798; 4,278,804; 4,368,235; 4,368,236; 4,410,594.

The disclosures of these patents are incorporated by reference herein. Other art-recognized variations of said coating compositions may be employed in the present invention.

Component C, the primer coating, is produced by polymerization of a monomer mixture comprising two essential reagents. Reagent C-1, present in major proportion, is at least one acrylic monomer. The term "acrylic monomer" as used herein includes acrylic and methacrylic acids and their derivatives, chiefly esters and amides. Acrylamide, methyl acrylate, ethyl acrylate, methyl methacrylate and ethyl methacrylate are illustrative, and of these the esters (especially of alkanols containing 1–4 carbon atoms) are preferred; the methacrylate esters are most preferred because their polymers exhibit particularly high weather resistance. The preparation and use of acrylic primers is disclosed in the aforementioned U.S. Pat. No. 4,239,798.

Reagent C-2 is characterized by formula I in which $R^1$ may be hydrogen or methyl. The Z value is a linking group which is substantially inert under prevailing conditions of use. Suitable linking groups will be apparent to those skilled in the art; illustrative moieties which may be present therein are hydrocarbon radicals free from ethylenic and acetylenic unsaturation, oxygen atoms, NH and $NR^3$ groups wherein $R^3$ is a hydrocarbon radical free from ethylenic and acetylenic unsaturation, carbonyl groups and sulfone groups.

Examples of suitable Z values are the following:

Alkylene, especially lower alkylene (the term "lower" denoting up to 7 carbon atoms) and most especially methylene.

Radicals of the formula

(II)

wherein $R^2$ is an alkylene radical, especially ethylene or propylene and most especially ethylene.

Radicals of the formula

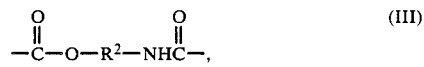

(III)

wherein $R^2$ is as defined above.

Especially preferred as Z are —CH$_2$— and groups having formula II wherein $R^2$ is ethylene and is attached to $X^1$.

The $X^1$ value is an ultraviolet degradation-inhibiting moiety. Many of such moieties are known in the art, and any of them are useful according to the present invention. Examples are hydroxybenzophenone, hydroxyarylbenzotriazole, benzoate ester, phenyl salicylate, benzylidenemalonate and aryl-substituted 2-cyanoacrylate and 2-cyanocrotonate moieties. A large number of moieties of these types are disclosed in the aforementioned U.S. Pat. No. 4,410,594 and in *Encyclopedia of Polymer Science and Technology*, Vol. 14, pp. 125–148, especially Table 4 at pp. 140–141. The latter publication is incorporated herein by reference.

Particularly preferred as the $X^1$ moiety according to this invention are radicals of the formula

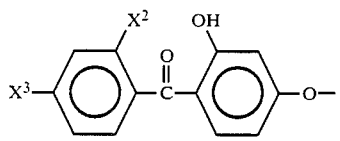

wherein each of $X^2$ and $X^3$ is hydrogen or hydroxy. Preferably, each of $X^2$ and $X^3$ is hydrogen. Also included, however, are polyhydroxy compounds such as those in which $X^2$ or both $X^2$ and $X^3$ are hydroxy.

Suitable compounds of formula I may be prepared by known reaction sequences starting from precursors containing the appropriate ultraviolet degradation-inhibiting moieties. Examples of suitable reactions are esterification, reaction with ethylene oxide followed by esterification, and the like. A number of such compounds are known in the art; examples are 2-hydroxy-4-acryloxyethoxybenzophenone, 2-hydroxy-4-methacyloxyethoxybenzophenone, 2-hydroxy-4-allyloxybenzophenone and 2-hydroxy-4-(2-hydroxy-3-methacryloxypropyl)benzophenone. These compounds and similar ones, and methods for their preparation, are disclosed in the following U.S. patents:

U.S. Pat. Nos. 3,215,665; 3,313,866; 4,310,650.
The disclosures of these patents are also incorporated by reference herein.

Other monomers may also be present in the monomer mixture for component C, typically in amounts up to about 25% by weight based on reagent C-1. Examples are ethylenically unsaturated silane monomers, including such materials as vinylsilanes and δ-methacryloxypropyltrimethoxysilane, and polyfunctional acrylates as described hereinafter when the primer coating is produced by polymerization of a deposited monomer layer.

The composition from which the primer coating is deposited is typically a solution in a substantially inert organic liquid of an addition copolymer prepared by polymerizing a mixture containing about 5–35% by weight of reagent C-2, with the balance being reagent C-1 or a combination thereof with any other monomers present. Organic liquids which may be employed include alcohols, ethers, esters and the like; examples thereof are ethylene glycol, ethylene glycol monomethyl ether, ethylene glycol dimethyl ether, ethylene glycol monobutyl ether, diethylene glycol and ethers thereof, butyl acetate, ethylene glycol diacetate, and mixtures of the foregoing. Copolymer emulsions or suspensions may also be used. The total monomer concentration in the solution, emulsion, suspension or the like is typically about 5–50% by weight.

Polymerization is usually indicated by the action of one or more free radical polymerization initiators such as benzoyl peroxide, tertiary butyl hydroperoxide, acetyl peroxide, hydrogen peroxide, azobisisobutyronitrile, persulfate-bisulfite, persulfate-sodium formaldehyde sulfoxylate, chlorate-sulfite and the like. Polymerization by techniques such as ultraviolet, electron beam or plasma irradiation is also contemplated. Chain transfer agents, typically mercaptans such as butanethiol or dodecanethiol, may be present in the solution. Polymerization most often precedes deposition of the primer on the base resin, but deposition followed by polymerization is also possible. In the latter case, crosslinking monomers such as polyfunctional acrylates may be present in minor amounts, typically up to about 5% by weight of the monomer mixture. The primer coating composition may additionally contain such materials as antioxidants, flow control agents, quenchers, dyes, pigments, surfactants, flatting agents and the like.

The preparation of primer coating compositions useful according to this invention is illustrated by the following examples. All parts, percentages and other proportions in the examples herein are by weight unless otherwise indicated.

EXAMPLES 1–3

Solutions of 50 grams of a mixture of ethyl methacrylate and reagent C-2, 0.25 gram of azobisisobutyronitrile and 0.15 gram of dodecanethiol in 200 ml. of toluene were heated at 80° C. under nitrogen for 18 hours, with stirring. An additional 0.125 grams of azobisisobutyronitrile was then added and heating was continued for four hours. The solutions were poured into methanol, the precipitated amorphous copolymers were removed by filtration and 6 parts of each was dissolved in 94 parts of a solvent mixture consisting of 80% ethylene glycol monobutyl ether and 20% ethylene glycol diacetate. The constitutions of the compositions thus obtained are listed in Table I.

TABLE I

| | Reagent C-2 | |
|---|---|---|
| Example | Percent of monomer mixture | Identity |
| 1 | 20 | 2-Hydroxy-4-acryloxy-ethoxybenzophenone |
| 2 | 20 | 2-Hydroxy-4-methacryloxyethoxybenzophenone |
| 3 | 10 | 2-Hydroxy-4-allyloxybenzophenone |

In the practice of the present invention, the primer coating is first formed on the base resin article by methods which may include conventional coating operations such as flowing, spraying, dipping, brushing, roller coating, spin coating, drawing down or the like followed by removal of any solvent or other inert liquid by evaporation and then by drying, typically at a temperature within the range of about 20°–150° C. and preferably 50°–150° C. The thickness of the primer coating thus applied is typically substantially uniform and is about 0.002–1.0 mil, most often about 0.01–0.1 and preferably about 0.02–0.08 mil.

The hardcoat is then applied to the primed article, ordinarily by one of the coating operations previously recited, and is subsequently cured by heating at a temperature within the range of about 75°–150° C., optionally in the presence of a condensation catalyst. The thickness of the hardcoat is usually about 0.1–0.7 mil, preferably about 0.2–0.3 mil. The product of these operations is an article according to the present invention; its appearance and color are substantially those of the base resin and it is protected from ultraviolet degradation and discoloration and from damage from abrasion, solvent action and the like.

The preparation and testing of articles of this invention is illustrated by the following examples.

EXAMPLE 4

Primer coating compositions prepared according to Examples 1–3 were flow-coated on bisphenol A polycarbonate panels, drained for 15 minutes and dried at 130° C. for 15 minutes. The primed panels were then flow-coated with commercial silicone hardcoat coating compositions prepared as follows:

Hardcoat I: A suspension in 2-methyl-1-propanol of 2 parts of methyltrimethoxysilane and 1 part of an aqueous colloidal silica suspension, an an amount to provide 20% solids after standing for several hours.

Hardcoat II: A combination of Hardcoat I and 10–15% (based on solids content) of a silanated derivative of 2,4-dihydroxybenzophenone of the type disclosed in the aforementioned U.S. Pat. No. 4,278,804.

The coated panels were drained for 30 minutes and cured at 130° C. for 90 minutes. They were then subjected to consecutive 8-hour cycles of exposure to fluorescent ultraviolet light at 70° C. and 4-hour cycles of high humidity at 50° C. The adhesion of the hardcoats was tested by scribing with a crosshatch cutter, applying pressure-sensitive tape to the crosshatched area and rapidly removing the tape. Primer thicknesses were determined by etching away the primer with sulfuric acid and tracing across the etched area with a thickness-measuring instrument.

The results are given in Table II. The control was similarly prepared using as the primer an ethyl methacrylate homopolymer solution. Adhesion ratings are given in hours to failure; i.e., to the point when hardcoat was removed upon removal of the pressure-sensitive tape.

TABLE II

| Identity | Primer thickness, mils | Hardcoat | Failure time, hrs. |
|---|---|---|---|
| Ex. 1 | 0.02 | I | 570 |
| Control 1 | 0.02 | I | 170 |
| Ex. 1 | 0.02 | II | >3930 |
| Ex. 2 | 0.07 | II | >3690 |
| Ex. 3 | 0.02 | II | 2903 |
| Control 2 | 0.04 | II | 640 |

EXAMPLE 5

A test panel similar to those of Example 4 was prepared using the primer coating composition of Example 2, and a silicone hardcoat solution identical to Hardcoat I, except that it additionally contained 4% (based on solids content) of 2,4-dihydroxybenzophenone. The resulting panel was transparent and colorless. A control panel, prepared identically except that the primer was a solution of 5 parts of an ethyl methacrylate homopolymer and 10 parts of 2,4-hydroxybenzophenone in 85 parts of ethylene glycol monobutyl ether, was a distinctly pink color.

What is claimed is:

1. A solid article of manufacture comprising (A) a resin base; (B) an abrasion-resistant surface coating on said resin base; and (C) a primer coating between said resin base and said surface coating, said primer coating comprising an addition copolymer of a monomer mixture comprising (C-1) a major proportion of at least one acrylic monomer and (C-2) a minor proportion of at least one ethylenically unsaturated monomer having the formula

wherein $R^1$ is hydrogen or methyl, Z is a substantially inert linking group, and $X^1$ is an ultraviolet degradation-inhibiting moiety.

2. An article according to claim 1 wherein component A is an aromatic polycarbonate resin.

3. An article according to claim 2 wherein component B is a silicone hardcoat coating.

4. An article according to claim 3 wherein Z is —CH$_2$— or

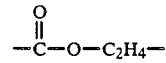

with the ethylene radical attached to $X^1$.

5. An article according to claim 4 wherein component A is a bisphenol A polycarbonate.

6. An article according to claim 5 wherein reagent C-1 is an acrylate or methacrylate ester.

7. An article according to claim 6 wherein reagent C-1 is ethyl methacrylate.

8. An article according to claim 7 wherein the thickness of component C is about 0.01–0.1 mil.

9. An article according to claim 8 wherein $X^1$ has the formula

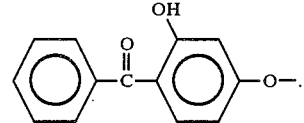

10. An article according to claim 9 wherein Z is CH$_2$ and $R^1$ is hydrogen.

11. An article according to claim 9 wherein Z is

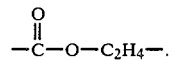

12. An article according to claim 11 wherein $R^1$ is hydrogen.

13. An article according to claim 11 wherein $R^1$ is methyl.

* * * * *